(12) United States Patent (10) Patent No.: US 7,415,457 B2
Dombroski et al. (45) Date of Patent: Aug. 19, 2008

(54) USING A CACHE TO PROVIDE CURSOR ISOLATION

(75) Inventors: Matthew Dombroski, Lancaster, MA (US); Ekrem Soylemez, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 10/898,280

(22) Filed: Jul. 23, 2004

(65) Prior Publication Data

US 2004/0254947 A1    Dec. 16, 2004

Related U.S. Application Data

(63) Continuation-in-part of application No. 10/424,003, filed on Apr. 25, 2003, now Pat. No. 7,171,427, and a continuation-in-part of application No. 10/423,356, filed on Apr. 25, 2003, and a continuation-in-part of application No. 10/417,732, filed on Apr. 16, 2003.

(60) Provisional application No. 60/379,870, filed on May 10, 2002, provisional application No. 60/375,726, filed on Apr. 26, 2002.

(51) Int. Cl.
*G06F 7/00* (2006.01)
(52) U.S. Cl. ................................................ 707/3
(58) Field of Classification Search .................. 707/3
See application file for complete search history.

(56) References Cited

U.S. PATENT DOCUMENTS

| | | | |
|---|---|---|---|
| 5,799,300 A | 8/1998 | Agrawal et al. | |
| 5,907,848 A | 5/1999 | Zaiken et al. | |
| 5,918,232 A | 6/1999 | Pouschine et al. | |
| 5,987,467 A | 11/1999 | Ross et al. | |
| 5,999,943 A | 12/1999 | Nori et al. | |
| 6,163,774 A | 12/2000 | Lore et al. | |
| 6,173,292 B1 | 1/2001 | Barber et al. | |
| 6,185,572 B1 * | 2/2001 | Blackman et al. | 707/103 R |
| 6,205,447 B1 | 3/2001 | Malloy | |
| 6,282,537 B1 | 8/2001 | Madnick et al. | |
| 6,385,604 B1 | 5/2002 | Bakalash et al. | |
| 6,421,665 B1 | 7/2002 | Brye et al. | |
| 6,438,537 B1 | 8/2002 | Netz et al. | |
| 6,493,699 B2 | 12/2002 | Colby et al. | |
| 6,553,366 B1 | 4/2003 | Miller et al. | |
| 6,560,594 B2 | 4/2003 | Cochrane et al. | |
| 6,567,928 B1 | 5/2003 | Lyle et al. | |

(Continued)

OTHER PUBLICATIONS

U.S. Appl. No. 10/423,356, filed Apr. 25, 2003, Office Action Mailing Date May 14, 2007.

(Continued)

*Primary Examiner*—Chong H Kim
(74) *Attorney, Agent, or Firm*—Hickman Palermo Truong & Becker LLP

(57) ABSTRACT

In one approach disclosed herein, a cache is used to provide cursor isolation. The cache is used to cache data that is updated in a query. Specifically, when a query is initiated, one or more caches may be instantiated in respect of the cursor. When data is updated during the query, the updated data is stored in the cache. By storing the updated data in the cache, the updated data is isolated from other users, from other sessions and from other queries by the same user.

32 Claims, 8 Drawing Sheets

U.S. PATENT DOCUMENTS

| | | | |
|---|---|---|---|
| 6,587,857 | B1 | 7/2003 | Carothers et al. |
| 6,618,822 | B1 | 9/2003 | Loaiza et al. |
| 6,629,102 | B1 | 9/2003 | Malloy et al. |
| 6,651,073 | B1 | 11/2003 | Lyle et al. |
| 6,665,682 | B1 | 12/2003 | DeKimpe et al. |
| 6,711,575 | B1 * | 3/2004 | Applewhite et al. ......... 707/100 |
| 6,826,556 | B1 | 11/2004 | Miller et al. |
| 6,931,418 | B1 | 8/2005 | Barnes |
| 6,941,310 | B2 * | 9/2005 | Ahad et al. ................. 707/100 |
| 6,980,980 | B1 | 12/2005 | Yeh |
| 7,020,647 | B1 | 3/2006 | Egan et al. |
| 7,194,465 | B1 | 3/2007 | MacGregor |
| 2002/0059195 | A1 | 5/2002 | Cras et al. |
| 2002/0087516 | A1 | 7/2002 | Cras et al. |
| 2002/0091707 | A1 | 7/2002 | Keller |
| 2002/0103807 | A1 | 8/2002 | Yamashita |
| 2002/0126545 | A1 | 9/2002 | Warren et al. |
| 2002/0138353 | A1 | 9/2002 | Schreiber |
| 2002/0168621 | A1 | 11/2002 | Cook et al. |
| 2002/0184187 | A1 | 12/2002 | Bakalash et al. |
| 2002/0188598 | A1 | 12/2002 | Myllymaki |
| 2003/0014417 | A1 | 1/2003 | Kelkar |
| 2003/0084053 | A1 | 5/2003 | Gorvin et al. |
| 2003/0088540 | A1 | 5/2003 | Edmunds et al. |
| 2003/0093424 | A1 | 5/2003 | Chun et al. |
| 2003/0101202 | A1 | 5/2003 | Kelkar et al. |
| 2003/0195865 | A1 | 10/2003 | Long et al. |
| 2003/0195866 | A1 | 10/2003 | Long et al. |
| 2003/0200197 | A1 | 10/2003 | Long et al. |

OTHER PUBLICATIONS

U.S. Appl. No. 10/898,304, filed Jul. 23, 2004, Office Action Mailing Date Jul. 16, 2007.

Ramsak, Frank, "Interactive ROLAP on Large Datasets: A Case Study with UB-Trees," Database Engineering & Applications, Jul. 16-18 2001, pp. 167-176.

Ross, Kenneth A., "Serving Datacube Tuples from Main Memory," Scientific and Statistical Database Management, Jul. 26-28, 2000, pp. 182-195.

IBM, "Treating Data Transformations as Objects", IBM Technical Disclosure Bulletin, vol. 35, Issue 4a, Sep. 1992, 5 pages.

* cited by examiner

USING A CACHE TO PROVIDE CURSOR ISOLATION

CROSS REFERENCE TO RELATED APPLICATIONS

This application is a continuation-in-part of and claims the benefit of domestic priority from:

U.S. patent application Ser. No. 10/424,003 entitled "Methods of Navigating a Cube that is Implemented as a Relational Object," filed on Apr. 25, 2003 now U.S. Pat. No. 7,171,427, which claims the benefit of priority from U.S. Provisional Application No. 60/379,870, entitled "Online Analytical Processing (OLAP) Operations and Access Structures for Data Stored in a Relational Database," filed on May 10, 2002;

U.S. patent application Ser. No. 10/423,356 entitled "Using Relational Structures to Create and Support a Cube Within a Relational Database System," filed on Apr. 25, 2003, which also claims the benefit of priority from U.S Provisional Application Ser. No. 60/379,870, entitled "Online Analytical Processing (OLAP) Operations and Access Structures for Data Stored in a Relational Database," filed on May 10, 2002; and U.S. patent application Ser. No. 10/417,732 entitled "Techniques for Managing What-If Analysis of Data Managed by a Relational Database System," filed on Apr. 16, 2003; which claims the benefit of priority from U.S. Provisional Application Ser. No. 60/375,726, entitled "Integrating Online Analytical processing (OLAP) functions Into A Relational Database Management System (RDMBS)," filed on Apr. 26, 2002.

This application is related to U.S. patent application Ser. No. 10/898,304 entitled "Using a Multidimensional Database as a Surrogate for a Hash Table in the Context of a Relational Query," by Matthew Dombroski, Ekrem Soylemez and Andrew Witkowski, filed on Jul. 23, 2004.

The contents of all of which are incorporated by reference in their entirety for all purposes, as if fully set forth herein.

FIELD OF INVENTION

The invention generally relates to computer systems, and, more specifically, relates to approaches for using a cache to provide cursor isolation.

BACKGROUND OF THE INVENTION

The approaches described in this section are approaches that could be pursued, but not necessarily approaches that have been previously conceived or pursued. Therefore, unless otherwise indicated, the approaches described in this section are not admitted to be prior art, merely by inclusion in this section.

Historically, there has been a distinction between relational database management systems (RDBMS) and multidimensional database management systems (MDDBMS). Each type of system has evolved somewhat independently from the other and to meet different goals. There are many general differences between such systems, including (1) database schema, (2) processes used to store, access and retrieve such data, and (3) data analysis capabilities, to name a few. Many specific differences in the internal processes associated with relational and multidimensional database systems stem from these general differences.

One significant difference between relational and multidimensional database systems is the difference in their respective transaction models and operation of associated transaction engines. Generally, relational systems and processes are modeled to provide fast and efficient loading and revising of data, whereas multidimensional systems and processes are modeled to provide fast, complex real-time analytical processing of data. Furthermore, relational systems are modeled to support many short transactions, or sequences of operations, that are almost always committed. That is, the changes made by transactions executed in a relational database system are almost always made permanent to the database. Also, typical relational systems must be able to provide read consistency for relational operations. Specifically, it is expected that a relational operation does not see any changes committed by other users, where the commit time of those changes is after the start time of the relational operation.

In contrast, multidimensional systems are modeled to support long transactions that frequently are not committed. Specifically, the changes made by transactions executed in multidimensional system are usually temporary, only visible to the transaction that is making the changes, and must be removed from the database after the transaction terminates.

Large-scale data transaction processing, which is typically associated with relational systems, is often referred to as OLTP (On-Line Transaction Processing). Real-time analytical processing of data is often referred to as OLAP (On-Line Analytical Processing), and with respect to multidimensional data, MOLAP (Multidimensional On-Line Analytical Processing).

Not only do relational and multidimensional database systems meet different needs, in addition, such systems have historically been configured as separate stand-alone systems. In some instances, such systems are configured with special interfaces that attempt allow the system to emulate the functionality of another type of system. For example, U.S. Pat. No. 6,484,179 describes techniques for organizing multidimensional data in a relational database system in a manner that improves the performance of OLAP operations within the relational database system.

However, in prior approaches, the two disparate systems are not truly integrated. Prior approaches do not provide efficient large-scale analytical processing of transactions on relationally stored data, while maintaining desired properties of such data. For example, prior approaches do not provide the ability to efficiently handle multi-session what-if analysis transactions (e.g., MOLAP transactions) on relationally managed data, while maintaining the ACID (atomicity, consistency, isolation, durability) transaction properties typically associated with relationally managed data. What-if analyses are popular scenarios in data warehouse environments, particularly for assimilation of data in a business decision-making context. A data warehouse is a consolidated view of enterprise data, optimized for reporting and analysis. Basically, a data warehouse is an aggregated, sometimes summarized copy of transaction and non-transaction data specifically structured for dynamic querying, analysis and reporting.

Database servers execute commands that conform to database language. A database language supported by most relational database servers is know as structured query language ("SQL"). A database command written in SQL may include a "MODEL clause. A MODEL clause provides numerous beneficial features, and is particularly useful in the context of integrated relational and multidimensional data. Specifically, use of the MODEL clause allows database developers to treat relational data as multidimensional arrays. Dimensionally aware calculations can then be defined on the arrays. As a result of the foregoing structure, a MODEL clause may be used to cause a database server to resolve formula dependencies automatically, therefore supporting large sets of interlinked calculations in sophisticated applications. In particular, a MODEL clause is useful in the processing of complex calculations that involve inter-row references. Before the SQL language was extended to support the MODEL clause, such complex calculations often demanded the use join and union statements, which are cumbersome and painstaking to develop.

Certain facets of how a database server can handle database commands that include the MODEL clause are described in U.S. patent application Ser. No. 10/898,304 entitled "Using a Multidimensional Database as a Surrogate for a Hash Table in the Context of a Relational Query," filed on Jul. 23, 2004, which is incorporated by reference into this patent application.

A cursor is a pointer to a data item. Typically, one cursor is associated with each query. The term "cursor isolation" refers to how a cursor runs with respect to other active transactions in the system. Specifically, if a cursor is "isolated," the cursor runs independent of other transactions. Cursor isolation during an SQL query has not been an issue until the introduction of the SQL MODEL clause. This is because standard SQL queries do not update data, and, therefore, do not require cursor isolation. More particularly, the problem is specific to queries which use a predefined multidimensional database as a surrogate for a hash table. The use of an analytic workspace as a surrogate for a hash table was first proposed in U.S. patent application Ser. No. 10/898,304 entitled "Using a Multidimensional Database as a Surrogate for a Hash Table in the Context of a Relational Query," filed on Jul. 23, 2004, which is mentioned above. Previously, in the context of relational databases, cursor isolation was not an issue because all data updates occurred in an in-core hash table that was created upon the execution of a query. However, if a multidimensional database is used, updates occur against a permanent data store.

The term "cursor isolation" refers to how a cursor runs with respect to other active transactions in the system. Specifically, if a cursor is "isolated," the cursor runs independent of other transactions, and therefore cannot see the changes made in other transactions. Similar to other types of database commands, the MODEL clause specifies calculations to be done on data. However, rather than simply creating new columns to hold the results of the calculations, the operations performed by the MODEL directly replace the data that is involved in the operations.

When a query includes a clause that updates data in a multidimensional database, such as a MODEL clause, various problems arise regarding the management and protection of data. Specifically, when one user performs a query and updates data, other users that perform a query on the same data typically see the version of the data that has been updated by the first user. However, this may not be desirable. Additionally, when a user performs multiple queries on the same data, it may be desirable to isolate the data among queries so that a single item of data is not updated by multiple queries. For example, if certain data is updated during a first query, it may be desirable to have the update be transparent to a second query. In other words, the data that is returned or updated by the second query is the version of the data that existed prior to update performed during the first query. In essence, it would be desirable to have an approach for isolating cursors from each other.

Prior art approaches have been developed to provide isolation across users. One such approach involves the use of buffers to cache query results within table functions. Specifically, the output of a query, including any changes made during the query, are written into a buffer that is used only to feed an SQL engine, and then deallocated. Another such approach involves the creation of temporary multidimensional variables with read-through capabilities. However, these approaches only apply to read-only data. Additionally, these approaches are very costly in terms of the computational resources that they consume. Also, such approaches were geared toward cursor isolation in the context of relational databases, and, therefore, only dealt with updates of data in hash tables. Such solutions did not deal with updates of data in analytic workspaces, and did not provide a mechanism for updating data on a cursor by cursor (e.g., query by query) basis. The approaches cannot be used with queries that update data, such as queries that include a MODEL clause.

Therefore, with the advent of the MODEL clause, there is a great need for approaches that can provide cursor isolation in an efficient manner, so that queries associated with separate cursors do not see updates performed by queries associated with other cursors.

BRIEF DESCRIPTION OF THE FIGURES

The disclosed subject matter is depicted by way of representative examples, and not by way of limitation, in the illustrations of the accompanying figures. The figures include.

DETAILED DESCRIPTION OF THE INVENTION

Figure 1A:
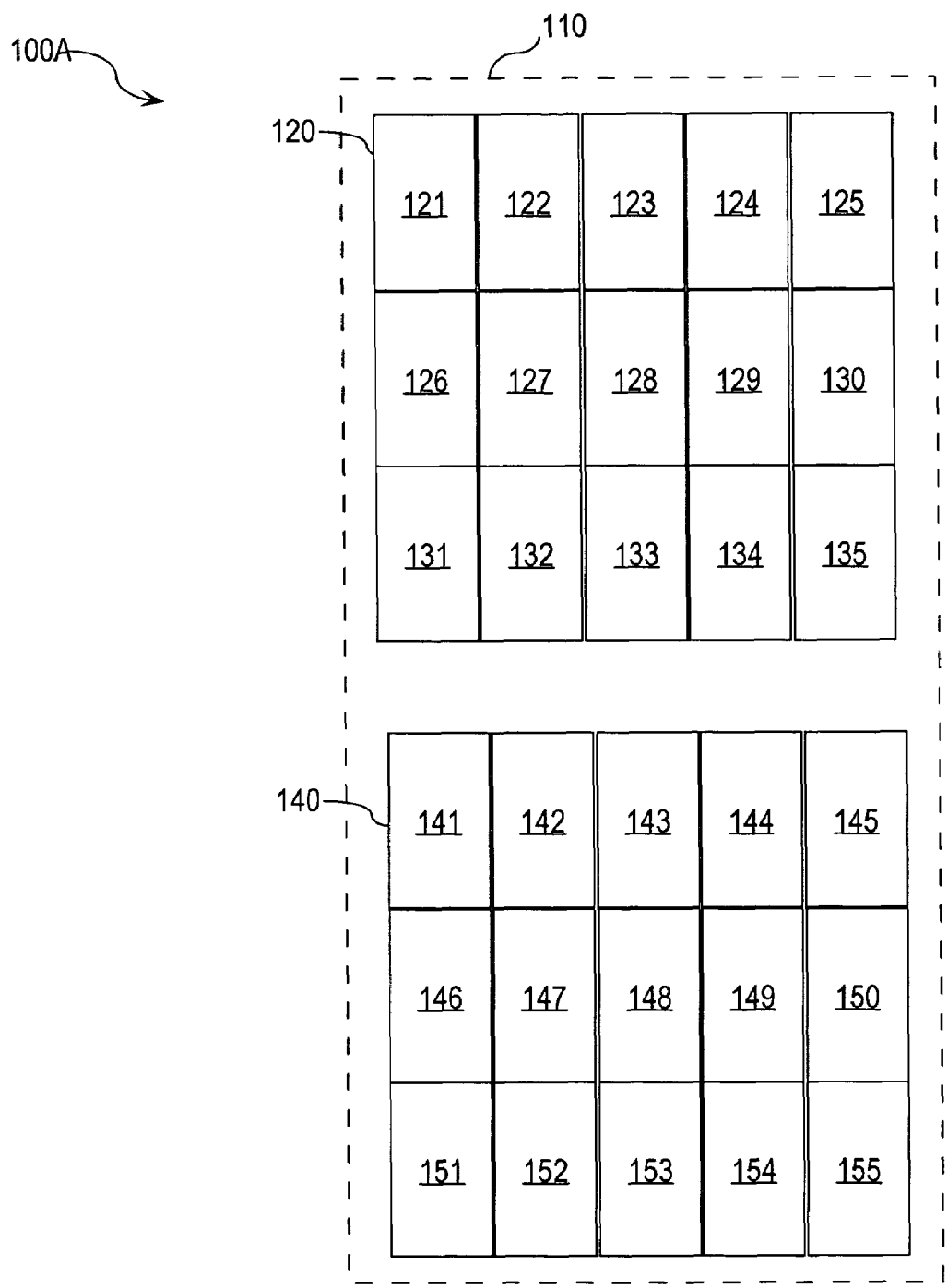
FIG. 1A is a block diagram depicting an embodiment of system 100A for isolating cursors.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In one approach disclosed herein, a cache is used to provide cursor isolation. The cache is used to cache data that is updated in a relational query. Specifically, when a query is initiated, one or more caches may be instantiated for the query. When data is updated during execution of the query, the updated data is stored in the cache. By storing the updated data in the cache, the updated data is isolated from other users, from other sessions and from other queries, including queries made by the same user.

FUNCTIONAL OVERVIEW

One or more caches are used to provide cursor isolation. In an embodiment, a cache that is only instantiated by a single query that updates a data item is instantiated upon the execution of the query. The updated data item is stored in the cache. If the data item must be subsequently used to perform the query, the data item is retrieved from the cache. Using this approach, the updated query items of each query may be kept separate from other queries.

Caches may be instantiated on per-operation, per-query, per-data item and per-user basis. For example, in a query with multiple instances of the MODEL construct, the same data item may be cached in multiple separate caches, one for each instance of the model construct within the query. Further, multiple caches may be instantiated upon the initiation of a query. Each of the caches may be associated with a different data item or class of data items updated by a query. Therefore, each updated item of data or class of data is isolated from other users or queries. The multiple caches are used for handling multiple simultaneous updates that occur within one query, as shall be described in greater deal hereafter.

Upon the termination of the query, the cache(s) may be destroyed. Additionally, in an embodiment, upon termination of the query, one or more items of data or classes of data in one or more caches may be stored in another storage device. For example, in one approach, upon termination of a query, an item of data or a class of data in a cache that was created for the query is persisted (e.g., stored) in a multidimensional database. In one embodiment, the multidimensional database is implemented using analytical workspaces, and the data is persisted in an analytic workspace. If other users have access to the analytic workspace, the cursor used to perform the query is not considered to be isolated vis-a-vis other queries or other users.

In an embodiment, various routines may be implemented to determine when and if cache data is to be persisted. Routines may also be implemented to resolve inconsistencies among data in separate caches and determine which data value should be persisted. Thus, the cache provides a means to facilitate updates of any non-relational data storage participating in a relation query that changes the non-relational data.

For the purpose of explanation, examples shall be given in the context of a system in which the non-relational data storage is a multidimensional database implemented using analytic workspaces. The cache(s) may serve as a source of data for updates to the non-relational data storage. By holding within the cache data updates that may ultimately be applied to the non-relational data storage, the cache provides a mechanism whereby time is gained for deciding what to do with the data updates (e.g., for deciding whether any updates should be persisted in the non-relational data storage, or for deciding which updates should be persisted). These features are a vast improvement over prior approaches, wherein the mechanisms that allowed updates of data to occur would need to be disconnected from the database during the process of persisting data.

In other embodiments, a cache may be reused by a same query or a same user, or may be reused by other queries or users. The cache may also be erased prior to reuse, in an embodiment.

For a practical example, consider a multidimensional database storage implemented using analytic workspaces, where an analytic workspace contains sales data. Queries that access data in the analytic workspace will each have a separate cursor. Additionally, single users may perform multiple queries, and therefore have multiple cursors. Each cursor may make separate updates on the same item of data, but there is a need to hide the updates made by a query associated with one cursor from other cursors. There will be a cache for each query, as well as a separate cache for each data item in each cursor or session. For example, there may be a cache for the dimension data of a particular query, as well as a cache for the sales data for the particular query. Updates made by separate queries will be kept in separate caches, and will therefore be hidden from one another. The approaches can be customized to allow certain cache data to be persisted, and, therefore, not hidden from other cursors.

The disclosed cache approaches function faster and more efficiently than the alternative approaches of the prior art, which employed buffers or the creation of temporary multi-dimensional variables with read-through capabilities. Such prior art approaches involved a great deal of data manipulation, and, therefore, were very resource intensive. Moreover, the prior art approaches did not address situations in which a query was capable of updating data. In this regard, the disclosed approaches provide a mechanism that help facilitate the implementation of queries, such as queries that contain as the MODEL clause, which update data. Additionally, when data is to be persisted, the disclosed approaches provide a more reliable method than the prior art approaches.

The isolation provided by the disclosed cache is complete. Therefore, the isolation prevents dirty reads, phantom reads and other anomalies that occur in data updating scenarios. However, of note, is the fact that the disclosed approaches now provide for a mechanism for self-protecting the data of a single user who is conducting multiple queries. Specifically, because the disclosed approaches provide for isolation among multiple queries by a single user, a user will not contaminate his or her own data by performing multiple queries. Heretofore, this problem has not been addressed.

PER-QUERY CACHING

FIG. 1A is a block diagram depicting an embodiment of system 100A for isolating cursors.

System 100A includes one or more caches 110. A separate cache 110 is instantiated each time an SQL query is made. In an embodiment, a single cache is associated with each query. When a data item is updated in a query, the updated data item is stored in the cache 110 that is associated with the query. In the embodiment shown in FIG. 1A, two caches 110 (i.e., cache 120 and cache 140) are instantiated in order to store updated data items related to separate queries (e.g., query 1 and query 2).

For example, query 1 results in an update of a data item related to sales volume. Upon the initiation of query 1, cache 120 is instantiated. Whenever query 1 results in an update of a data item, the updated data item is stored in cache 120. Similarly, upon the initiation of query 2, cache 140 is instantiated. Whenever query 2 results in an update of a data item, the updated data item is stored in cache 140.

When a data item is updated during a query, the data item is only updated in the cache 110 that is associated with the respective query. There is no update of the data item stored in permanent storage or other storage mediums, such as an analytic workspace. Because only the query for which the cache was created has access to the data in the cache, updated data items that are stored in the cache are hidden from other queries. For example, suppose cache 120 is associated with query 1, and cache 140 is associated with cache 140. If a data item is updated and stored in cache 120, query 2 will not have access to the updated data item that is stored in cache 120. If query 2 needs to retrieve the same data item, query 2 will retrieve the data item from another source. For example, query 2 could retrieve a different version of the data from cache 140, or, if the data item has been stored in cache 140, query 2 will retrieve the value of the data item from its original source, such as an analytical workspace, as described below in regard to FIG. 1B.

For example, suppose that query 1 retrieves and updates sales predictions for the year 2003. Query 1 will store the updated sales prediction in cache 120, in, for example, cell 121. As query 1 is processed, if the 2003 sales prediction data must be retrieved again, the data will be retrieved from cell 121. If query 2 updates or retrieves sales prediction data for 2003, it will not use the data stored in cell 121 or, for that matter, cache 120. Instead, cache 140 will be used by query 2 for storing updates to sales prediction data in 2003. If no updates have been stored in cache 140, sales prediction data for 2003 may be retrieved by query 2 from a memory source. Therefore, when an update is performed during a query, the disclosed embodiment provides an approach for hiding the updates from other queries. Thus, the cursors associated with queries 1 and 2 are said to be "isolated."

The disclosed approaches may be used with any number of queries or data items to isolate any number of cursors from one another.

Figure 1B:
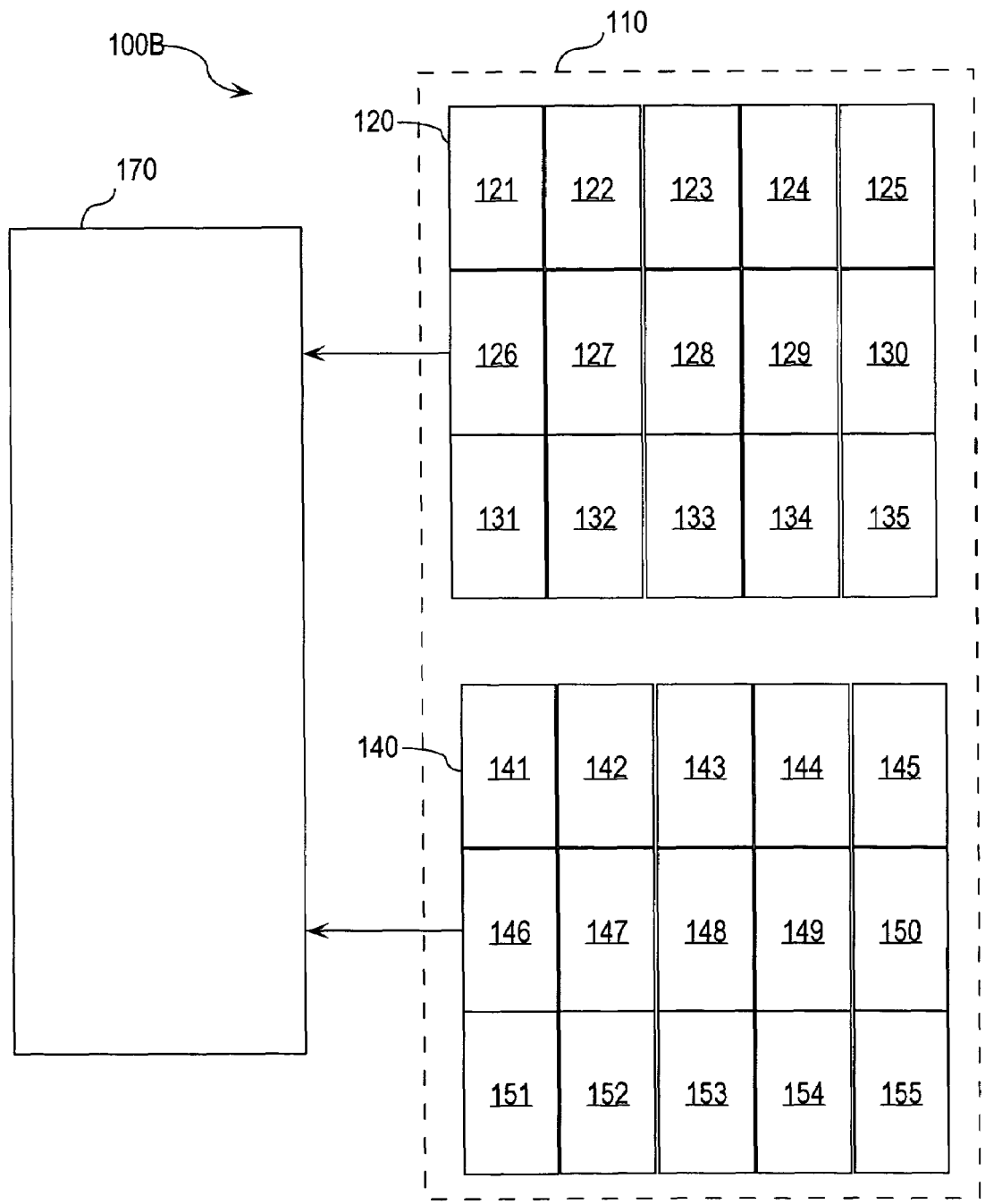
FIG. 1B is a block diagram depicting an embodiment of system 100B for isolating cursors.

FIG. 1B is a block diagram depicting an embodiment of system 100B for isolating cursors. In addition to cache 120, system 100B includes memory 170. Memory 170 may be an analytic workspace, or any other type of storage device. In an embodiment, the data items that must be used in the performance of a query are all stored in memory 170. As described above, when data items are updated during the execution of a query, the updated data items are stored in the cache that is associated with the query.

Accordingly, when the query for which cache 120 was created must retrieve a data item, the query will first look for the data item in cache 120. If the data item is not found in cache 120, the query retrieves the data item from memory 170. Memory 170 may be shared by various queries. Therefore, one may consider caches 110 as maintaining data items that are private to each query, and memory 170 as storing data items that are common to many queries. Caches 110 also provide a means for allowing private data items for separate users or sessions.

In an embodiment, system 100B comprises a mechanism for "persisting" the data that resides in caches 120 and 140. In other words, the mechanism stores data that resides in caches 120 and 140 back into memory 170. The data items stored in the cache may be stored in memory 170 pursuant to a user instruction, or may be automatically stored upon the occurrence of a specified event. In other embodiments, data is not persisted in memory 170.

PER-UPDATE CACHING

Figure 2:
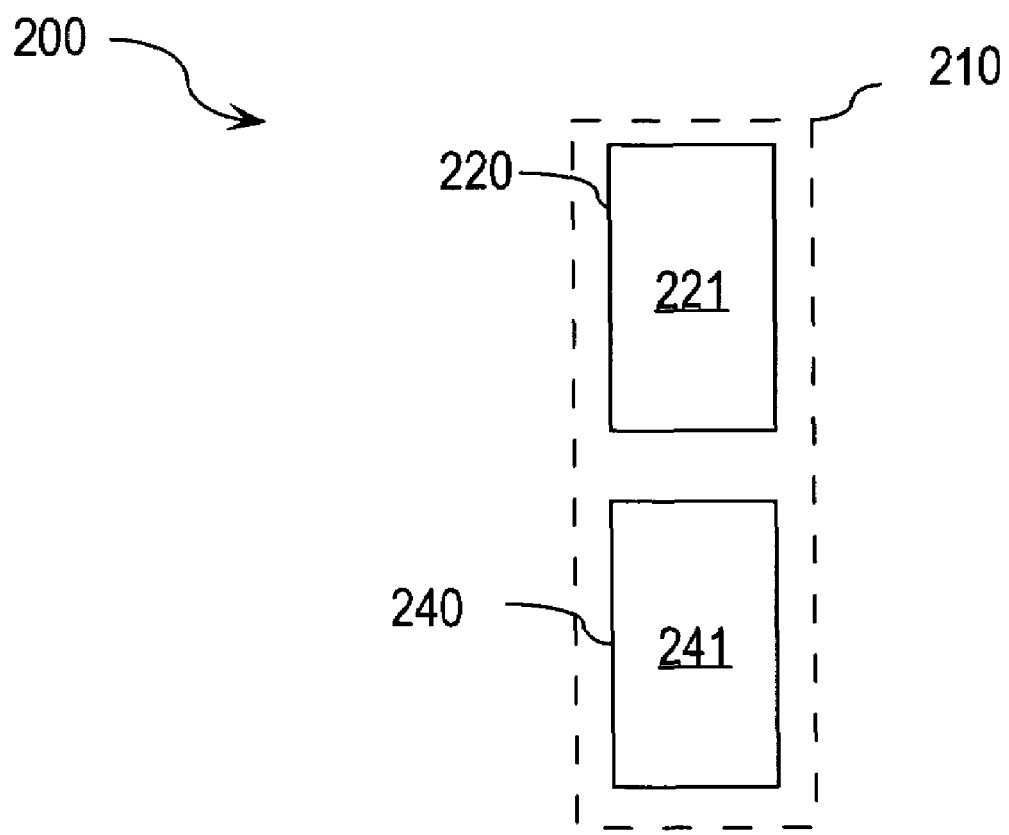
FIG. 2 is a block diagram depicting an embodiment of system 200 for isolating cursors.

FIG. 2 is a block diagram depicting an embodiment of system 200 for isolating cursors.

System 200 includes caches 210. Each of caches 210 is associated with a separate data item that may be updated by a single query. In many aspects, caches 210 function similar to caches 110, as described above. For example, when a data item is updated in a query, the updated data item is stored in the cache that is associated with the data item. Additionally, data may be persisted into a memory, if desired, in some embodiments.

System 200 enables each instance of updating a single data item to be isolated from other instances of updating the same data item during a single query. For example, if query 1 updates sales prediction data for 2003 twice, then each instance of updating the sales prediction data for 2003 results in a separate version of the data being maintained in a separate cache. Each particular separate version may then be referenced in the cache, as needed.

TECHNIQUES FOR ISOLATING CURSORS

Figure 3:
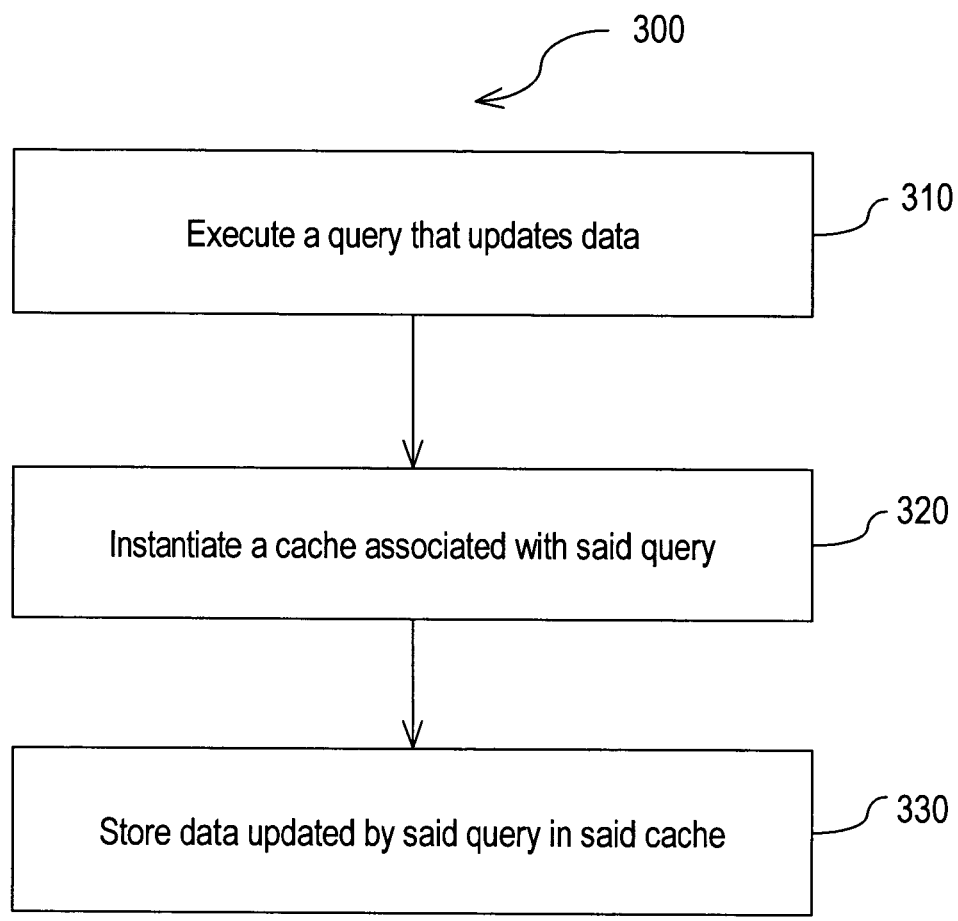
FIG. 3 is a flow chart depicting an embodiment of method 300 for isolating cursors.

FIG. 3 is a flowchart depicting an embodiment of method 300 for isolating cursors.

Method 300 includes step 310, in which a query that updates data is initiated. In other embodiments, method 300 may not include step 310, but instead may comprise a step of receiving or detecting a query that updates data.

A query is considered to update data if the performance of the query results in, or requires updating the value of a data item stored in memory or in a cache.

Step 320 includes instantiating a cache associated with a query that updates data. In other words, when a query is initiated, detected or received, a cache will be created and will be associated with the query. If other queries are initiated, a separate cache may be created for each query. Additionally, in an embodiment, a separate cache may be instantiated for each data item that may be updated during the performance of the query. Also, in other embodiments, separate caches may be instantiated for each user, for each session, or for each execution of the same query.

Step 330 includes storing data updated by the query of step 310 in the cache that is instantiated in step 320. Data items that are updated are stored in the cache. Data items to be updated may initially reside in memory. On subsequent updates, the data item stored in the cache may be re-updated. When the data item is required for subsequent processing, the value of the data item will be retrieved from the cache. If the data item is not found in the cache, the data item may be retrieved from memory.

ISOLATING CURSORS ON A DATA ITEM BY DATA ITEM BASIS

Figure 4:
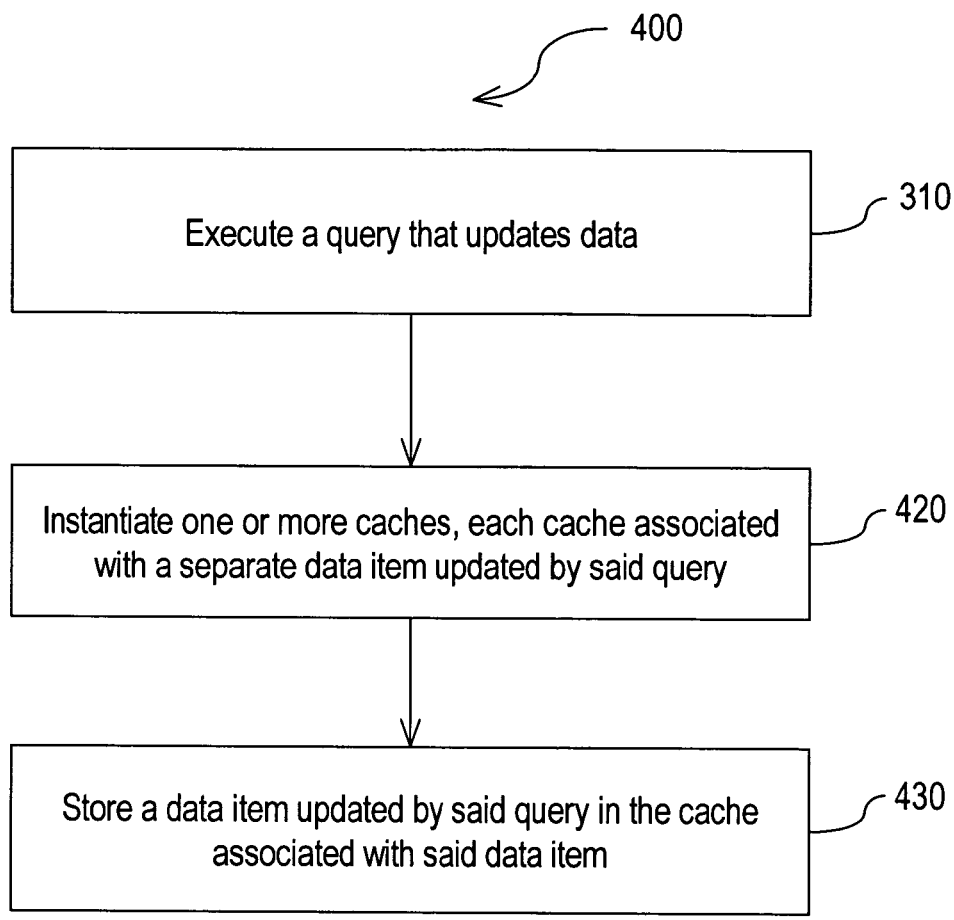
FIG. 4 is a flow chart depicting an embodiment of method 400 for isolating cursors.

FIG. 4 is a flow chart depicting an embodiment of method 400 for isolating cursors on a data item by data item basis.

Method 400 includes step 310 at which a query that updates data is executed, as described above. Step 310 is not necessarily a critical element of method 310. In other embodiments, step 310 may be replaced by a step of detecting a query or receiving a query.

Step 420 includes instantiating one or more caches, where each cache is associated with a separate data item updated by the query of step 310.

For example, assume that a query will result in updating data items relating to, namely, turnover, expenses and net profit. In this case, in step 320, three caches will be instantiated: a turnover cache, an expense cache and a net profit cache.

Step 430 comprises storing a data item updated by a query in the cache associated with the data item. For example, in the case where there is a separate cache for a data item relating to turnover, whenever a data item relating to turnover data is updated, the data item is stored in the cache associated with a data item relating to turnover.

PERSISTING DATA STORED IN CACHES

Figure 5:
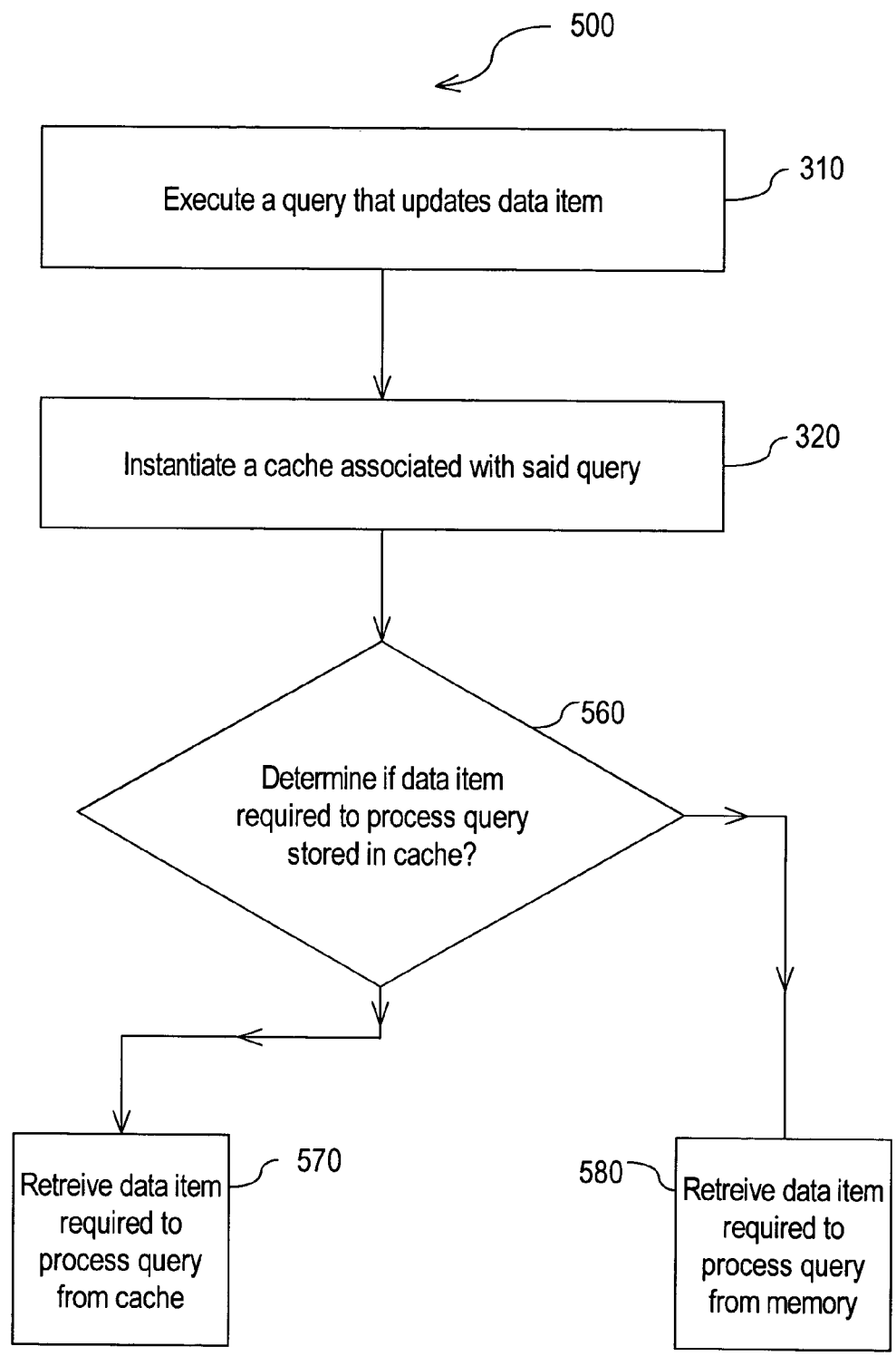
FIG. 5 is a flow chart depicting an embodiment of method 500 for isolating cursors.

FIG. 5 is a flowchart depicting an embodiment of method 500 for isolating cursors and persisting data stored in caches.

Method 500 includes steps 310 and 320, which are described above. Additionally, method 500 includes step 560. Step 560 includes determining whether data required to process a query is stored in a cache. The determination in step 560 may include accessing the cache to check to see if the required data item is present in the cache. In an embodiment, method 500 may also include a step of determining which cache to access in order to find cached data.

If it is determined that the data item required to process the query is stored in the cache, then, in step 570, the data item will be retrieved from the cache. The data item may then be used to process the query.

If it is determined that the data item required to process the query is not stored in the cache, then, in step 580, the data item will be retrieved from memory. The data item may then be used to process the query.

Figure 6:
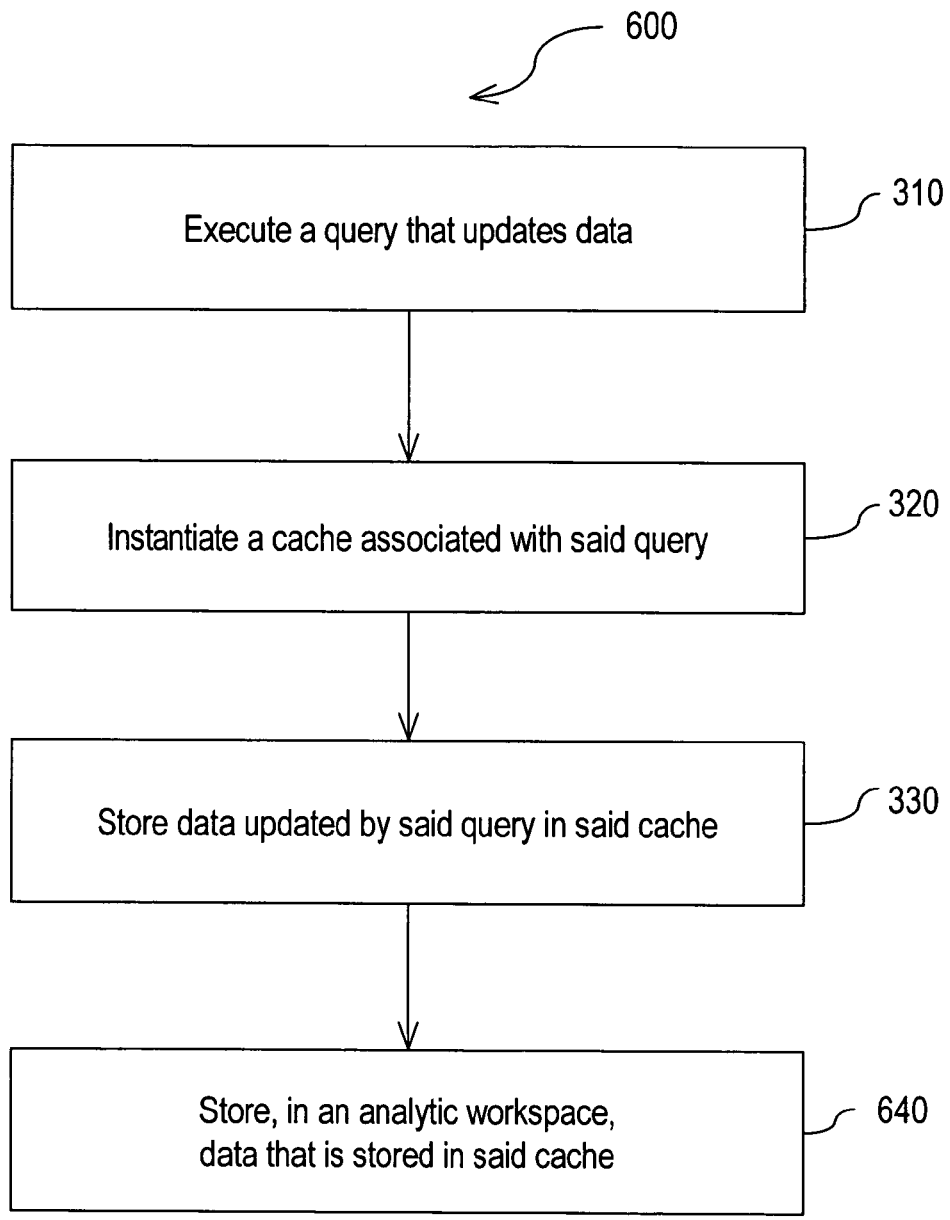
FIG. 6 is a flow chart depicting an embodiment of method 600 for persisting data stored in a cache.

FIG. 6 is a flow chart depicting an embodiment of method 600 for persisting data stored in a cache.

Method 600 includes steps 310, 320 and 330, which are described above. Upon the completion of step 330, data that is updated in a query is stored in a cache associated with the query. However, as described above, depending upon the embodiment, the cache may only be accessed by a particular query, user, session, or query instance. In some cases, it may be desirable to use the cached data item across sessions, across users or across queries. In order to make the data item available to other queries, users or sessions, the data item may be persisted. For example, the cached data item may be stored in an analytic workspace or in another storage medium that is not private to the particular query.

By using method 600, the cache serves as a medium for holding data items that are to be persisted. In embodiments, method 600 may include steps for specifying or determining which data items in cache(s) are to be persisted.

ADDITIONAL USES FOR QUERY ISOLATION

The approaches for cursor isolation described herein may be used to isolate cursors during queries that update data items, such as queries that involve a MODEL clause. However, there are wider applications of the cursor isolation techniques described herein. One additional approach concerns the OLAP concept of custom members.

In this regard, using the disclosed cursor isolation techniques, a user may issue a query that changes a data model by adding additional dimension members. Such additional dimension members are visible only to the user, and only for a particular period of time. Therefore, the disclosed approaches provide a mechanism for defining the scope and lifetime of dimension members.

It is possible to specify changes that apply for the duration of a cursor (cursor-duration changes) and changes that apply for the duration of a session (session-duration changes). According to one embodiment, the cursor-duration changes are maintained separate from the session-duration changes so as not to interfere with any session-duration changes. Specifically, upon the termination of a cursor, the cursor-duration changes are deallocated without deallocating the session-duration changes.

For example, the disclosed approaches allow one to add or modify dimension members to add new data forecasts, or to examine pessimistic or optimistic forecasts. The forecast data is used for a specified scope and duration. If the user would like to keep the forecast data, then the forecast data may be persisted in an analytic workspace or other area of memory, as described above.

A specific example of these wider approaches is found in the area of sales data analysis. By using the disclosed approaches, a user may modify sales regions and examine the results of the resulting data models. In certain models, the Eastern Sales Region may include New York and Boston. Sales data from these regions is included in a data model. However, using the disclosed approaches, a user may include an additional custom member, such as Providence, in the Eastern Sales Region. The user may specify the scope and duration of this additional member. Sales data from Providence may be stored in a cache that is only visible to the user for a specified time, and is not visible to other users or to other queries. If the user wishes to keep the model with Providence sales data, then the cached Providence sales data may be stored in an analytic workspace that may be accessed by other users. In an embodiment, the cached sales data from Providence may be stored in an analytic workspace that is private to a single user, but is accessed by multiple queries.

HARDWARE OVERVIEW

The approach for using a cache to provide cursor isolation that are described herein may be implemented in a variety of ways and the invention is not limited to any particular implementation. The approach may be integrated into a computer system or a network device, or may be implemented as a stand-alone mechanism. Furthermore, the approach may be implemented in computer software, hardware, or a combination thereof.

Figure 7:
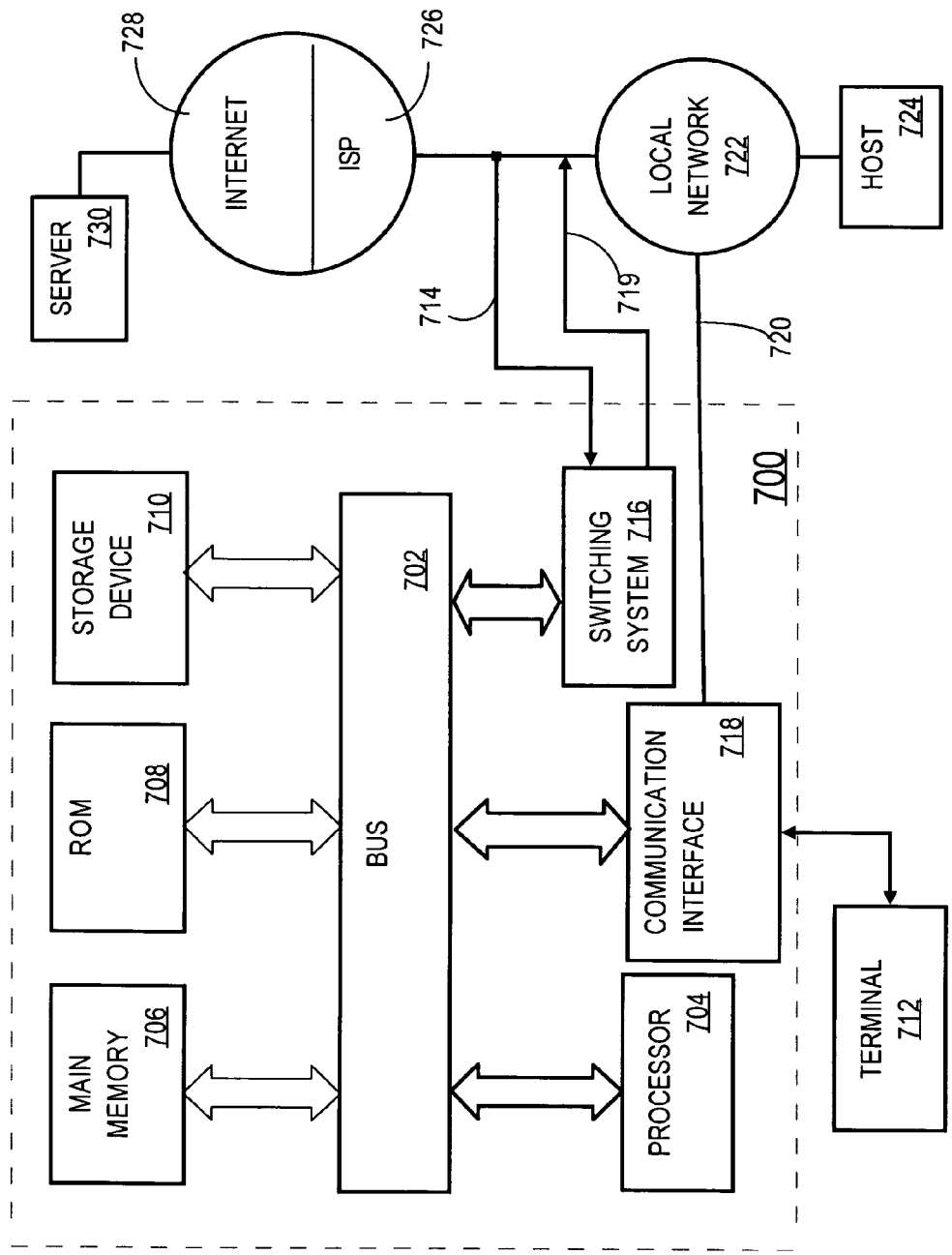
FIG. 7 is a block diagram depicting an embodiment of system 700 upon which embodiments of the disclosed approaches may be implemented.

FIG. 7 is a block diagram that depicts a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 430 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing a relational query comprising:
   in response to executing, within a relational database server, a relational query that updates a data item in a non-relational data store, performing the steps of:
   loading, from said non-relational data store, a copy of the data item into volatile memory;
   updating the copy of said data item to create an updated data item;
   instantiating a cache associated with said relational query; and
   storing said updated data item in said cache.

2. The method of claim 1 wherein:
   the relational query is one of a plurality of relational queries that update the data item; and
   each query of said plurality of relational queries uses a different cache of a plurality of caches to concurrently store updated versions of the data item, to isolate changes made by each query of the plurality of queries from changes made by each other query of the plurality of queries.

3. The method of claim 1 wherein:
   the relational query specifies multiple independent operations that update the data item; and
   each operation of said multiple operations uses a different cache of a plurality of caches to concurrently store updated versions of the data item, to isolate changes made by each operation of the multiple operations from changes made by each other operation of the multiple operations.

4. The method of claim 3 wherein the multiple operations correspond to multiple instances of the MODEL construct within the relational query.

5. The method of claim 1 wherein the non-relational data store is a multidimensional database.

6. The method of claim 5 wherein the multidimensional database includes an analytical workspace.

7. The method of claim 1, further comprising the step of:
   retrieving said updated data item from said cache.

8. The method of claim 1, wherein the relational query includes a MODEL clause.

9. The method of claim 1, further comprising:
   persisting said updated data item in persistent memory.

10. The method of claim 9, wherein the persistent memory is within said non-relational data store.

11. The method of claim 1, wherein the query updates a plurality of items, the method further comprising:

updating each of said plurality of data items to create a plurality of updated data items;

instantiating a plurality of caches, wherein each cache of the plurality of caches associated with a different one of said plurality of data items; and storing each item of said plurality of data items in the cache associated with the data item.

12. The method of claim 1, further comprising the step of:
in response to a subsequent access of said updated data item during the query, retrieving said updated data items from the cache associated with the data item.

13. The method of claim 1, further comprising instantiating a plurality of caches, wherein each cache of the plurality of caches is associated with a separate data item updated by the relational query.

14. The method of claim 1, further comprising instantiating a plurality of caches, wherein each cache of the plurality of caches is associated with a separate user.

15. The method of claim 1, further comprising instantiating a plurality of caches, wherein each cache of the plurality of caches is associated with a separate category of data.

16. The method of claim 1, further comprising a step of accessing the data item persisted in persistent memory with another query.

17. A computer-readable medium carrying one or more sequences of instructions which, when executed by one or more processors, causes the one or more processors to perform the steps of:
in response to executing, within a relational database server, a relational query that updates a data item in a non-relational data store, performing the steps of:
loading, from said non-relational data store, a copy of the data item into volatile memory;
updating the copy of said data item to create an updated data item;
instantiating a cache associated with said relational query; and
storing said updated data item in said cache.

18. The computer-readable medium of claim 17, wherein:
the relational query is one of a plurality of relational queries that update the data item; and
each query of said plurality of relational queries uses a different cache of a plurality of caches to concurrently store updated versions of the data item, to isolate changes made by each query of the plurality of queries from changes made by each other query of the plurality of queries.

19. The computer-readable medium of claim 17, wherein:
the relational query specifies multiple independent operations that update the data item; and
each operation of said multiple operations uses a different cache of a plurality of caches to concurrently store updated versions of the data item, to isolate changes made by each operation of the multiple operations from changes made by each other operation of the multiple operations.

20. The computer-readable medium of claim 19, wherein the multiple operations correspond to multiple instances of the MODEL construct within the relational query.

21. The computer-readable medium of claim 17, wherein the non-relational data store is a multidimensional database.

22. The computer-readable medium of claim 21, wherein the multidimensional database includes an analytical workspace.

23. The computer-readable medium of claim 17, further comprising instructions for:
retrieving said updated data item from said cache.

24. The computer-readable medium of claim 17, wherein the relational query includes a MODEL clause.

25. The computer-readable medium of claim 17, further comprising instructions for:
persisting said updated data item in persistent memory.

26. The computer-readable medium of claim 25, wherein the persistent memory is within said non-relational data store.

27. The computer-readable medium of claim 17, wherein:
the query updates a plurality of items;
the instructions further comprise instructions for:
updating each of said plurality of data items to create a plurality of updated data items;
instantiating a plurality of caches, wherein each cache of the plurality of caches associated with a different one of said plurality of data items; and
storing each item of said plurality of data items in the cache associated with the data item.

28. The computer-readable medium of claim 17, further comprising instructions for:
in response to a subsequent access of said updated data item during the query,
retrieving said updated data items from the cache associated with the data item.

29. The computer-readable medium of claim 17, further comprising instructions for instantiating a plurality of caches, wherein each cache of the plurality of caches is associated with a separate data item updated by the relational query.

30. The computer-readable medium of claim 17, further comprising instructions for instantiating a plurality of caches, wherein each cache of the plurality of caches is associated with a separate user.

31. The computer-readable medium of claim 17, further comprising instructions for instantiating a plurality of caches, wherein each cache of the plurality of caches is associated with a separate category of data.

32. The computer-readable medium of claim 17, further comprising instructions for accessing the data item persisted in persistent memory with another query.

* * * * *

UNITED STATES PATENT AND TRADEMARK OFFICE
CERTIFICATE OF CORRECTION

PATENT NO. : 7,415,457 B2 Page 1 of 1
APPLICATION NO. : 10/898280
DATED : August 19, 2008
INVENTOR(S) : Dombroski et al.

It is certified that error appears in the above-identified patent and that said Letters Patent is hereby corrected as shown below:

In column 2, line 57, delete "know" and insert -- known --, therefor.

Signed and Sealed this

Sixteenth Day of March, 2010

David J. Kappos
*Director of the United States Patent and Trademark Office*